United States Patent [19]
Connolly

[11] Patent Number: 5,761,785
[45] Date of Patent: Jun. 9, 1998

[54] VACUUM TOOL FOR INSTALLING VALVE SPRING RETAINER AND KEYS

[75] Inventor: Brian Connolly, Macomb, Mich.

[73] Assignee: ABB Flexible Automation, Inc., New Berlin, Wis.

[21] Appl. No.: 497,215

[22] Filed: Jun. 30, 1995

[51] Int. Cl.$^6$ .............................. B23P 19/04; B25B 11/00
[52] U.S. Cl. ........................ 29/249; 29/213.1; 29/214; 29/244; 29/252; 269/21
[58] Field of Search .................... 29/249, 213.1, 29/244, 214, 215, 227, 252, 222; 269/21

[56] References Cited

U.S. PATENT DOCUMENTS

| | | | |
|---|---|---|---|
| 2,094,043 | 9/1937 | Marshall | 269/21 |
| 2,318,866 | 5/1943 | June | |
| 2,434,456 | 1/1948 | Cook | 29/249 |
| 3,052,018 | 9/1962 | Anderson | |
| 3,052,969 | 9/1962 | Loven | |
| 3,192,873 | 7/1965 | Tullis | |
| 3,314,136 | 4/1967 | Giles | 29/252 |
| 3,377,691 | 4/1968 | Kasper et al. | |
| 3,392,434 | 7/1968 | Giles | |
| 3,564,697 | 2/1971 | Shalaty et al. | 29/249 |
| 3,568,292 | 3/1971 | Kasper et al. | 29/208 |
| 3,793,999 | 2/1974 | Seiler et al. | 29/249 |
| 3,979,811 | 9/1976 | Kanneraad | 29/215 |
| 4,006,929 | 2/1977 | Barker | 269/21 |
| 4,095,324 | 6/1978 | Lawson | 29/249 |
| 4,304,035 | 12/1981 | Ecker | 29/249 |
| 4,494,306 | 1/1985 | Immonen | 29/809 |
| 4,562,629 | 1/1986 | Cerio | 29/156.7 |
| 4,667,388 | 5/1987 | Browning | 29/249 |
| 4,787,130 | 11/1988 | Hale | 29/213.1 |
| 4,845,821 | 7/1989 | Sakimori et al. | 29/213.1 |
| 5,207,196 | 5/1993 | Kuonen et al. | 29/215 |
| 5,588,208 | 12/1996 | Sato et al. | 29/222 |

FOREIGN PATENT DOCUMENTS

4681G3002 12/1972 Germany.

*Primary Examiner*—Timothy V. Eley
*Assistant Examiner*—Lee Wilson
*Attorney, Agent, or Firm*—Godfrey & Kahn, S.C.

[57] ABSTRACT

A method and apparatus for reliably placing the spring retainer and keys on a valve stem, to lock the valve spring in place. The apparatus includes a linear actuator, having an extended position and a retracted position, and a connector for connecting the linear actuator to a carrying member, such as a robotic arm. A gripper is attached to the linear actuator, adapted to grip the spring retainer. The keys reside in a retainer-key kit, held therein by gravity, and are presented to the gripper in a predetermined position by a positioning device. As the linear actuator is extended from its retracted position to its extended position, the gripper engages the retainer-key kit. The retainer-key kit is then withdrawn from the positioning device by retracting the linear actuator. The gripper and retainer-key kit are then transported to the cylinder head so that the retainer-key kit is substantially positioned for application to the valve stem. The linear actuator is then extended to its extended position to apply the retainer onto the valve stem. At about the same time, vacuum is applied to the keys to draw the keys to a position above the retainer. After the retainer is applied to the valve stem, positive pressure is applied to the keys to move the keys back into the retainer, around the valve stem, as the gripper is withdrawn from the retainer by retracting the linear actuator.

7 Claims, 3 Drawing Sheets

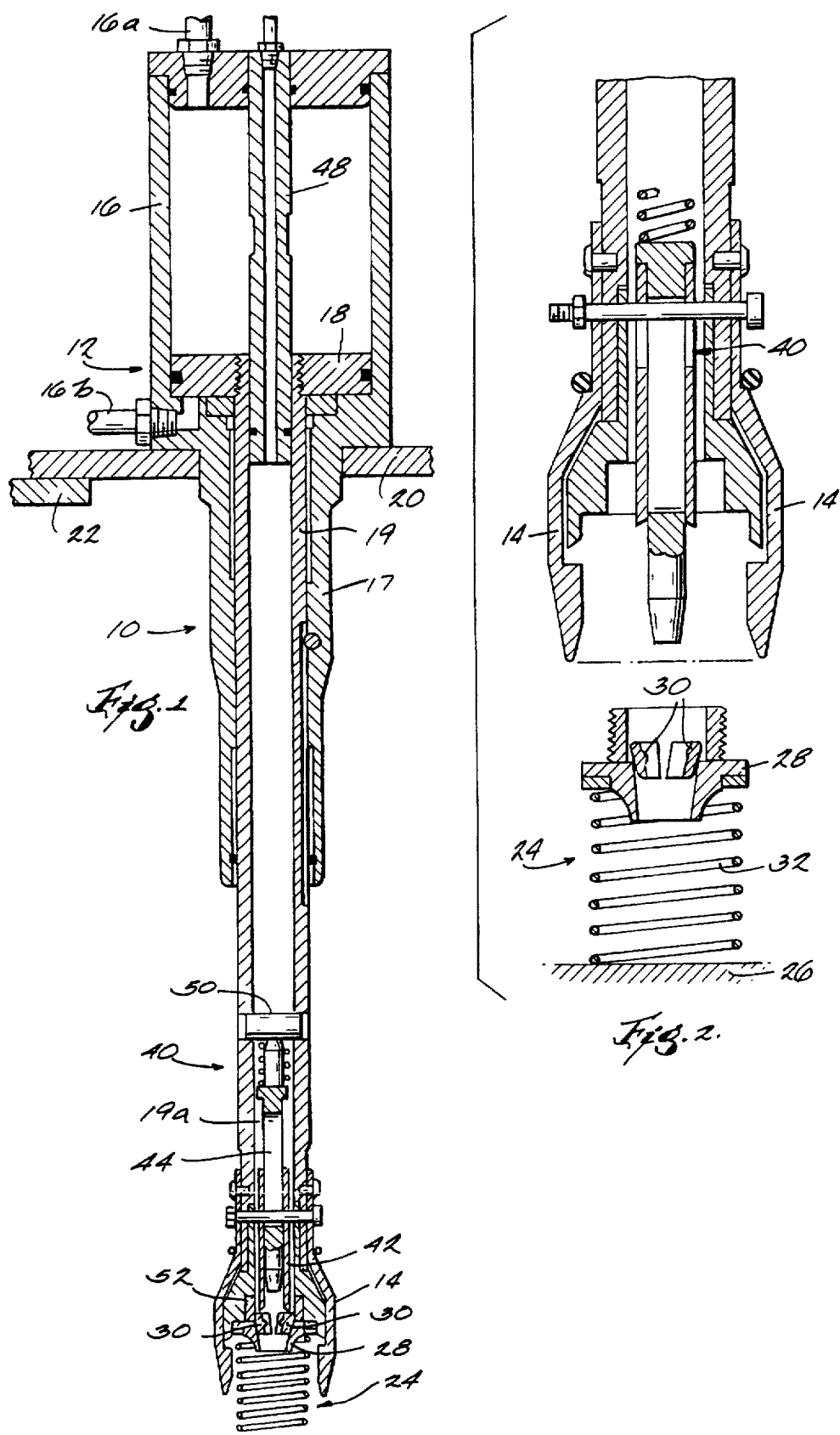

1

VACUUM TOOL FOR INSTALLING VALVE SPRING RETAINER AND KEYS

BACKGROUND OF THE INVENTION

This invention relates to tools for applying springs, spring retainers and spring retainer keys to valve stems, and in particular to tools for automatically assembling the spring package of valve gear for internal combustion engines.

In conventional internal combustion engines, each cylinder valve is urged toward its closed position by a helical spring, which is compressed between a supporting surface on the cylinder head of the engine and a spring retainer or retaining ring surrounding the outer end of the stem of the valve. The spring retainer is usually formed somewhat like a washer with a frustoconical bore, and is usually secured to the valve stem by two or more collets or keys shaped to wedge between the valve stem and the retainer by the spring force on the retainer. For secure retention on the valve stem, the keys are formed with internal grooves and flanges, and the valve stem is provided with cooperating grooves and flanges. In this manner a reliable and strong axial affixation is obtained between the valve stem and the retainer, by means of these keys or collets.

The application of the spring and retainer in this manner, which is referred to as a "key up" operation, can be time consuming and repetitive, however. After the valves have been inserted into the cylinder head, the valve spring is placed around the valve stem and the spring is axially compressed by pressing down on the retainer ring. Once the top end of the valve stem is exposed, the two keys are positioned around the valve stem, and the spring is allowed to expand, which in turn raises the retainer ring up around the keys to press the keys against the valve stem and lock the valve spring in place. To date, the correct positioning of the valve keys on the stem is a source of difficulty, available equipment for accomplishing this function being reliable only about 60 to 70 percent of the time, on average.

Further, equipment previously available was unacceptably noisy in operation, causing a "crunch" sound each time the keys were positioned into the retainer. It would also be desirable to reduce or qualitatively improve this noise factor in the assembly operation, from the standpoint of the attending workers.

Another problem encountered in the key up operation is the scratching of valves by the keys on installation. Because valves are finely honed and machined, even apparently minor scratching can be unacceptable.

This invention relates to improvements to the valve spring insertion mechanisms described above, and to solutions to some of the problems raised or not solved thereby.

SUMMARY OF THE INVENTION

The invention provides a method and apparatus for reliably placing the retainer ring, spring and keys on the valve stem. The apparatus includes a linear actuator, having an extended position and a retracted position, and a connector for connecting the linear actuator to a carrying member, such as a robotic arm. A gripper is attached to the linear actuator, adapted to grip the spring retainer. The keys reside in a retainer-key kit and are held therein by gravity, presented to the gripper in a predetermined position by a positioning device. As the linear actuator is extended from its retracted position to its extended position, the gripper engages the retainer-key kit. The retainer-key kit is then withdrawn from the positioning device by moving the linear actuator to its retracted position. The gripper and retainer-key kit are then transported to the cylinder head so that the retainer-key kit is substantially positioned for application to the valve stem. A key control device is provided for moving the keys into a predetermined position with respect to the retainer while the retainer is being applied onto the valve stem, and for pushing the keys into the retainer after the retainer has been applied to the valve stem. That is, vacuum is applied to the keys to draw the keys to a position above the retainer, while the linear actuator is being extended to its extended position to apply the retainer onto the valve stem. The key control device then applies positive pressure to the keys to move the keys back into the retainer, around the valve stem as the gripper is withdrawn from the retainer by moving the linear actuator to its retracted position. The cycle is then restarted.

By use of this tool and method, reliability of the key up operation is increased from as low as 60 percent to 98 to 100 percent. Further, the noise generated by the key up operation is qualitatively reduced to the point that very little sound is produced by the components as they are assembled. And valve scratching is reduced substantially over the prior art.

Other objects and advantages of the invention will become apparent hereinafter.

DESCRIPTION OF THE DRAWING

FIG. 1 is a cross sectional view of a tool according to a preferred embodiment of the invention.

FIG. 2 is an enlarged cross sectional view of a portion of the tool shown in FIG. 1, and a retainer key kit positioned on a positioning device before pickup.

DESCRIPTION OF THE PREFERRED EMBODIMENTS

Figure 4:
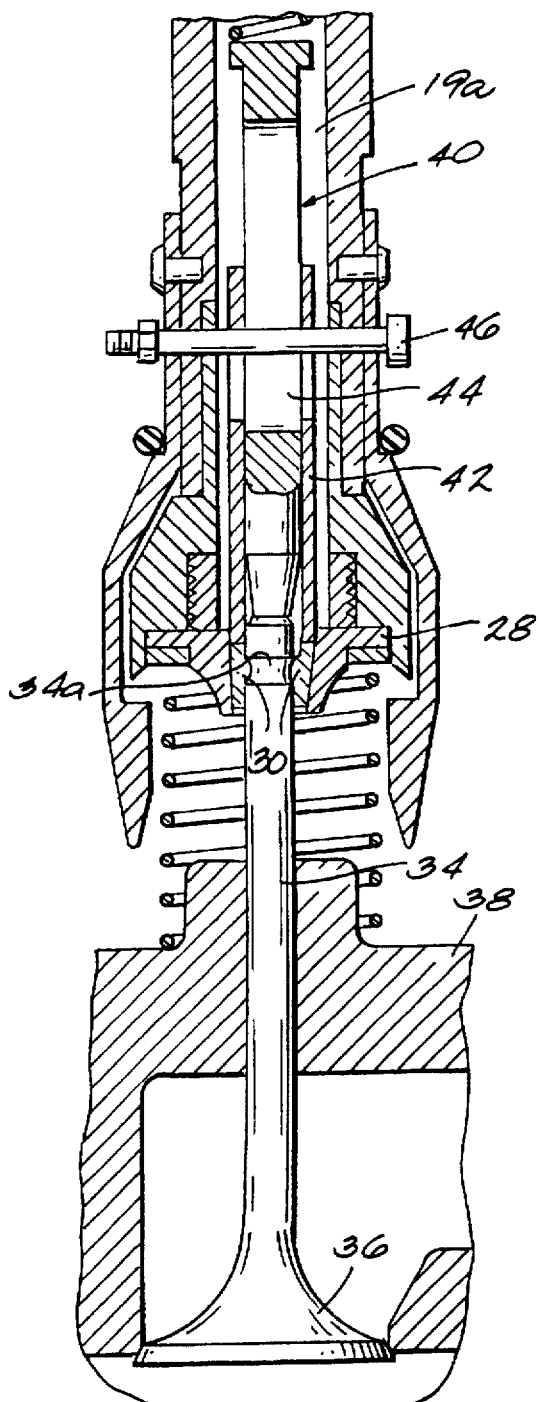
FIG. 4 is an enlarged cross sectional view of a portion of the tool shown in FIG. 1, in a position to begin lifting the tool off the retainer ring which has already been applied to the valve stem.

Referring now to FIG. 1, there is shown a tool 10 for automatically assembling the spring package of valve gear for internal combustion engines. According to the invention, the tool 10 includes a linear actuator 12 for extending and retracting a set of gripping fingers 14. While substantially any suitable linear actuator could be employed, a preferred embodiment employs a pneumatic cylinder 16, having sealed therein a piston 18, with a piston rod 19 attached to and moving with the piston, and extending out one end of the cylinder. In this embodiment the gripping fingers 14 are connected to the distal end of the piston rod 19. Attached to the cylinder 16 is a connector or mounting plate 20, for connecting the linear actuator to a carrying member shown somewhat schematically at 22, such as a robotic arm, which is capable of moving the tool between at least two stations. The cylinder 16 includes an extension port 16a and a retraction port 16b. Admitting air pressure via extension port 16a has the effect of extending the linear actuator to its extended position, while admitting air pressure via retraction port 16b has the effect of retracting the linear actuator to its retracted position. Air pressures of 20 to 100 psi are not unusual. The cylinder 16 may also include a cylinder sleeve 17 extending axially from one end of the cylinder over a portion of the piston rod 19, to steady and provide support to the piston rod in use.

Figure 5:
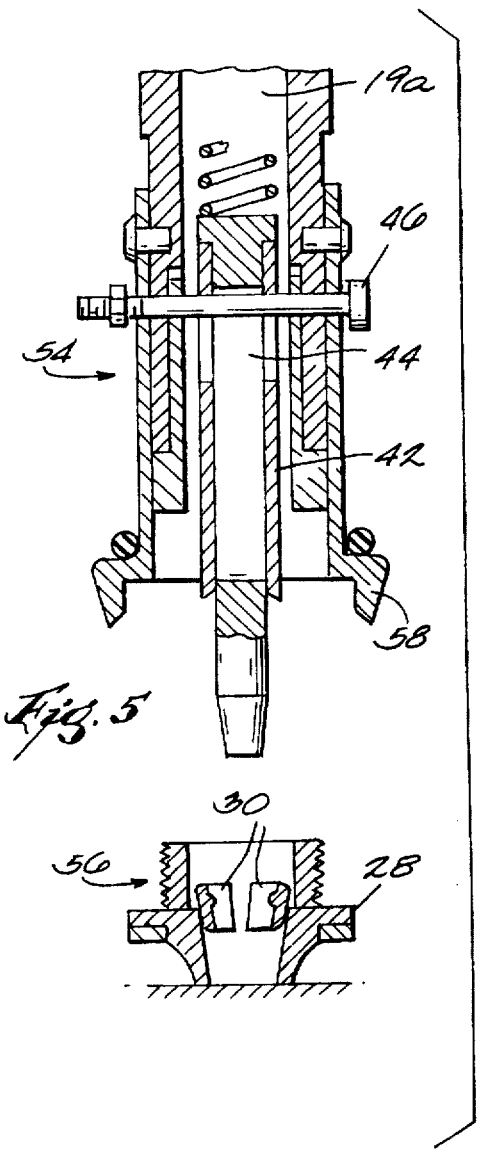
FIG. 5 is an enlarged cross sectional view of a portion of a tool according to a different embodiment, and a retainer key kit of the type without a spring positioned on a positioning device before pickup.
Figure 6:
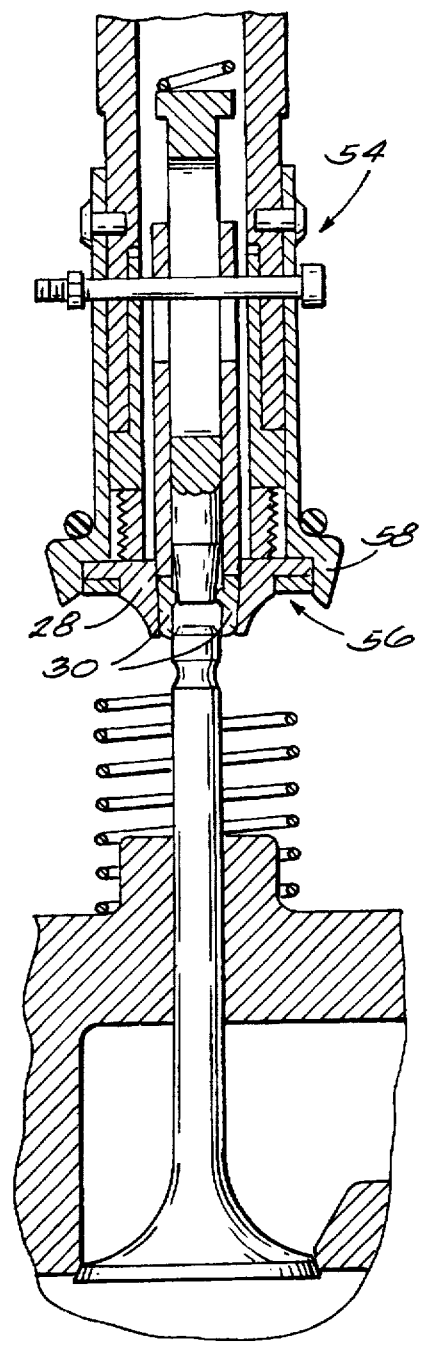
FIG. 6 is an enlarged cross sectional view of a portion of the tool shown in FIG. 5, in a position to begin lifting the tool off the retainer ring which has already been applied to the valve stem and spring.

A first station would be a pick-up station, shown at FIG. 2. At the pick-up station, a retainer key kit 24 is presented to the tool 10 by means of a positioning device 26, so that the kit is repeatably and reliably positioned at the same spot for each iteration of pickup. The retainer key kit 24 includes at least a retainer 28 and a set of keys 30. The retainer key kit 24 may also include a valve spring 32. While the invention in general works equally well whether or not the retainer key kit 24 does or does not include valve spring 32, the embodiment shown in FIGS. 1 through 4 is designed for retainer key kits that include a valve spring. As will be explained in more detail, the embodiment shown in FIGS. 5 and 6 is designed for use with retainer key kits 56 that do not include valve springs.

In order to pick up the retainer key kit 24, with the linear actuator 12 in its retracted position, the tool 10 is first properly positioned with respect to the positioning device 26 and the kit as shown in FIG. 2. The linear actuator 12 is then moved to its extended position, causing the gripping fingers 14 to slide onto the kit 24. The kit 24 is then held by the gripping fingers 14 by means of frictional forces. At that point, retracting the linear actuator 12 lifts the kit 24 off the positioning device 26. The carrying member 22 then moves the tool 10 and kit 24 to the second station. FIG. 1 shows tool 10 transporting kit 24 between the two stations.

The second station can be termed the key-up station, because that is the station where the retainer 28 and keys 30 are applied to a valve stem 34 of a valve 36. See FIG. 3. At this point the valve 36 has generally already been installed into the cylinder head 38, so that substantially only the valve stem 34 protrudes therefrom. The carrying member 22 then moves the tool 10 so that the retainer 28 is substantially axially aligned with the valve stem 34.

Figure 3:
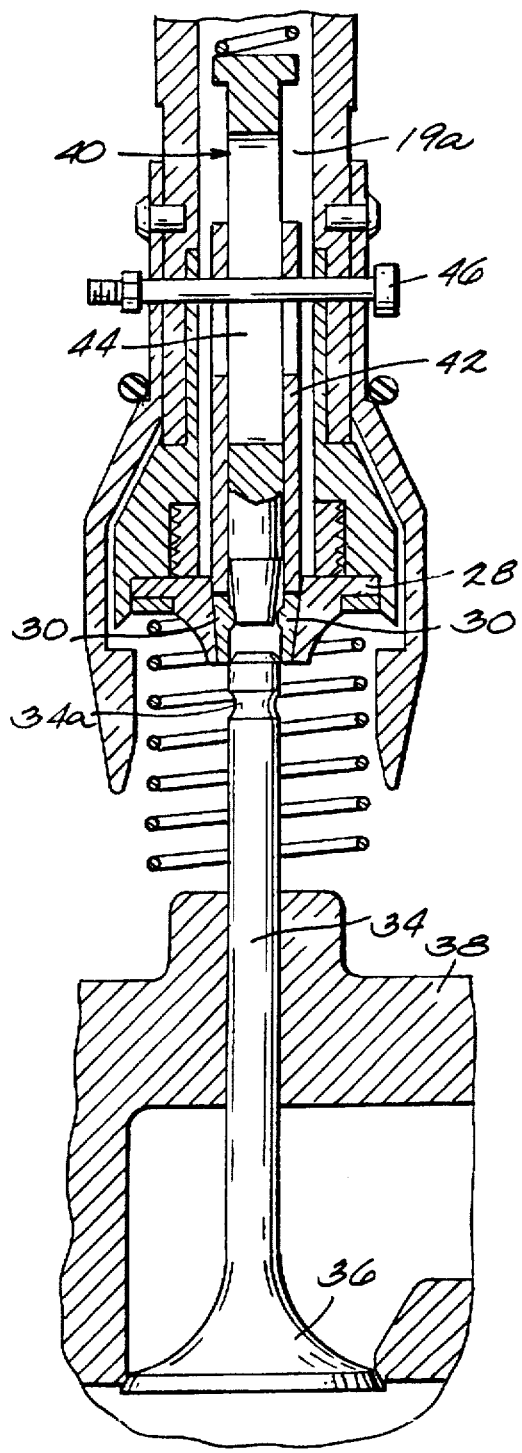
FIG. 3 is an enlarged cross sectional view of a portion of the tool shown in FIG. 1, shown in a position to begin placing the retainer ring onto the valve stem.

The linear actuator also includes a key control device 40. The purpose of the key control device is to temporarily move the keys 30 out of the retainer ring 28, as shown in FIG. 1, before the retainer ring is slid onto the valve stem 34, and later replace the keys back into the retainer ring, as shown in FIGS. 3 and 4, so as to lock the ring onto the valve stem. In a preferred embodiment, the key control device 40 operates by means of air movement. That is, at generally during or about the same time that the tool 10 is approaching the second station, the key control device 40 applies a vacuum above the area of the keys 30, thereby raising them out of the retainer ring 28 as shown in FIG. 1. The linear actuator 12 is then extended to its extended position, by which the retainer ring 28 is installed onto the valve stem 34, so that the valve stem protrudes through the central opening in the retainer ring as shown in FIG. 3. Thereafter the key control device 40 applies a puff of positive air pressure to push the keys 30 back into the retainer ring 28, with the valve stem still protruding through the central opening in the ring. By this action the keys 30 are applied around the valve stem 34, and locked there by the retainer ring 28.

As indicated above, in the preferred embodiment, the linear actuator 12 is a pneumatic cylinder 16, having a piston 18 trapped therein, and a piston rod 19 affixed to and moving with the piston and extending out of the cylinder. In this embodiment, the key control device 40 includes a key control sleeve 42 slidably mounted on a locator pin 44, which in turn is slidably mounted in a hollow area 19a inside the distal end of the piston rod 19, in the area of the gripping fingers 14. A limit pin 46 is passed through in the piston rod 19, and through the control sleeve 42 and locator pin 44, to prevent them from exiting the piston rod altogether. As shown in the drawing figures, in this embodiment the key control device 40 includes an air supply tube 48 (FIG. 1), which is mounted substantially coaxially within the cylinder 16 and passes through the piston 18, communicating with hollow area 19a inside the piston rod 19. A stop 50 (FIG. 1), through which air can pass, is positioned inside the hollow portion of the piston rod 19, spaced apart from the distal and thereof where the gripping fingers 14 are connected. The key control sleeve 42 and the locator pin 44 slide within the hollow area between the stop 50 and the end of the piston rod 19. The distal end of the piston rod 19 is open.

Thus, when the key control device 40 applies a vacuum, as described above, this vacuum is applied through the air supply tube 48, and has the effect of drawing air from the area of the gripping fingers 14, around the key control sleeve 42, over the locator pin 44, and through the piston rod 19. This vacuum then draws the keys 30 out of the retainer ring 28 as shown in FIG. 1, and into contact with the key control sleeve 42, and also into a retainer collar 52 provided for that purpose at the distal end of the piston rod 19. This vacuum can be applied simultaneously with the extension of the piston rod 19 toward valve stem 34, so that the keys 30 are removed for the retainer ring 28 before the retainer ring is placed onto the valve stem. The piston rod 19 continues to extend, moving the retainer ring 28 further onto the valve stem 34, until the piston 18 bottoms in cylinder 16, or until locator pin 44 bottoms between the valve stem and the stop 50, at which point the piston rod 19 stops traveling.

At this point the vacuum in the key control device 40 is turned off, and positive pressure is applied through the key control device to key control sleeve 42, as well as to the keys 30 themselves. Substantially simultaneously, the cylinder 16 begins to withdraw piston rod 19. As piston rod 19 travels away from the cylinder head 38, the retainer ring 28 also moves back with the force of the spring. With the key control sleeve 42 and keys 30 moving forward at the same time due to the positive air pressure acting on them, the keys move onto the valve stem 34 and into the groove 34a of the valve stem, where the retainer ring 28 locks the keys in place as it covers over them, as shown in FIG. 4. The cycle of the tool 10 is completed when the tool is returned to the first station to pick up another retainer key kit.

As indicated above, FIGS. 5 and 6 show a tool 54 constructed according to a different embodiment, designed for a retainer key kit 56 which includes only a retainer ring 28 and keys 30, and does not include a valve spring. As shown in FIG. 6, this type of kit can be use where the valve spring 32 is already installed on the cylinder head 38. The functioning of the tool 54 in this embodiment is the same as the functioning of the tool 10 in the first-described embodiment. The only difference is in the construction of the gripping fingers. Since there is no spring to grasp, the length of the gripping fingers 58 of this embodiment are reduced or shortened in comparison, having a length just sufficient to pick up the retainer ring 28.

By use of this method and either embodiment of the tool, reliability of the key up operation is increased from 60 or 70 percent to 98 percent or better. In addition, the noise generated by the key up operation is qualitatively reduced to the point that very little sound is produced by the components as they are assembled.

While the method and apparatus hereinbefore described are effectively adapted to fulfill the aforesaid objects, it is to be understood that the invention is not intended to be limited to the specific preferred embodiment of single bead key up tool and method of keying up valves set forth above. Rather, it is to be taken as including all reasonable equivalents to the subject matter of the appended claims.

I claim:

1. A tool for the automatic assembly of a retainer-key kit to a valve stem of a valve of an internal combustion engine head, said retainer-key kit including a spring retainer and at least two keys, said tool comprising:

- a linear actuator, having an extended position and a retracted position;
- a connector for connecting the linear actuator to a carrying member;
- a gripper attached to the linear actuator, adapted to grip the spring retainer, the keys residing in the retainer-key kit and held therein by gravity; and
- a key control device, for moving the keys into a predetermined position with respect to the retainer while the retainer is being applied onto the valve stem, and for pushing the keys into the retainer after the retainer has been applied to the valve stem;
- wherein said key control device moves the keys into the predetermined position by means of vacuum, and pushes the keys into the retainer by means of positive air pressure.

2. A tool as recited in claim 1 wherein said key control device comprises a key control sleeve, slidably mounted inside said linear actuator, and means for applying vacuum and positive air pressure through said linear actuator to move said key control sleeve in response to the vacuum and positive air pressure.

3. A tool as recited in claim 1 wherein said linear actuator comprises an air cylinder, having a piston trapped therein, and a piston rod affixed to the piston and extending outside the cylinder, and wherein said key control device moves the keys by means of air pressure exerted through the piston rod.

4. A tool as recited in claim 3 wherein said key control device moves the keys into the predetermined position by means of vacuum through the piston rod, and pushes the keys into the retainer by means of positive air pressure through the piston rod.

5. A tool as recited in claim 4 wherein said key control device comprises a key control sleeve, slidably mounted inside said piston rod, and means for applying vacuum and positive air pressure through said piston rod to move said key control sleeve in response to the vacuum and positive air pressure.

6. A tool for the automatic assembly of a retainer-key kit to a valve stem of a valve of an internal combustion engine head, said retainer-key kit including a spring retainer and at least two keys, said tool comprising:

- a linear actuator, having an extended position and a retracted position;
- a connector for connecting the linear actuator to a carrying member;
- a gripper attached to the linear actuator, adapted to grip the spring retainer, the keys residing in the retainer-key kit and held therein by gravity; and
- a key control device, for moving the keys into a predetermined position with respect to the retainer while the retainer is being applied onto the valve stem, and for moving the keys into the retainer after the retainer has been applied to the valve stem;
- wherein said key control device moves the keys by means of air pressure which acts directly on the keys.

7. A tool as recited in claim 6, wherein said linear actuator comprises an air cylinder, having a piston trapped therein, and a piston rod affixed to the piston and extending outside the cylinder, and wherein said key control device moves the keys by means of air pressure exerted through the piston rod.

* * * * *